United States Patent Office
3,214,290
Patented Oct. 26, 1965

3,214,290
PROCESS FOR PRODUCING MICROPOROUS COATINGS AND FILMS
William H. V. Larner, Jr., Hinckley, and Charles S. Schollenberger, Cuyahoga Falls, Ohio, assignors to The B. F. Goodrich Company, New York, N.Y., a corporation of New York
No Drawing. Filed Dec. 19, 1962, Ser. No. 245,654
2 Claims. (Cl. 117—135.5)

This invention relates to a unique method for obtaining permeability to water vapor in inherently impermeable polyurethane films. More particularly it relates to the production of water permeable polyurethane films or layers for use as the surface layer of a laminate construction designed to serve as a replacement for leather in articles such as shoe uppers and clothing.

Artificial or simulated synthetic leather substitutes are well known. Much effort has been expended, with only partial success, in an effort to adapt synthetic polymers as substitutes in uses where leather is employed. Some of the synthetic compositions which have been used recently to replace leather have been vinyl polymers, and mixtures of rubbers and vinyl polymers combined in sandwich structures with woven and non-woven fabrics treated with similar synthetic polymers. None of these materials has been fully satisfactory as a leather substitute. Although many of them are outstanding in some aspects, they are ordinarily seriously deficient in one or more desirable or vital properties. From an application viewpoint one of the most notable failures of the substitute materials proposed to date has been lack of permeability to water vapor.

Coated fabrics as a class do not possess the ability to "breathe" or transpire water vapor and air. For suitable use in shoes, boots, gloves and the like which enclose or cover a part of the human body, this property is a prime prerequisite. If moisture from the body cannot escape through the article, hands and feet for instance in the case of gloves and shoes will feel and actually be damp. Such articles are uncomfortable, and in the case of feet may cause dermatological troubles.

It is an object of this invention to provide a water permeable film which can be adhered to a non-woven fiber backing material to provide a leather like construction that will have sufficient water permeability to permit it to be fabricated into comfortable wearing shoes and other articles of clothing.

The objects of this invention are accomplished through the use of a particular type of decomposition agent which is incorporated into the film as a liquid or a solid and is then caused to decompose or transform to one or more gases, said gases being selected from those to which the film is known to be permeable. As the gases permeate the film and escape to the atmosphere, void spaces are left in the polyurethane film and it is through chains of these interconnected voids that water vapor can permeate in sufficient quantities to allow production of articles of apparel that will be comfortable to wear.

The polyurethane layer employed in the practice of this invention is a film formed from a particular polyesterurethane, the preparation of which is fully described in United States Patent 2,871,218, or a particular polyalkyleneetherurethane, the preparation of which is fully described in United States Patent 2,899,411. They are essentially linear polyurethanes characterized by being thermoplastic, extrudable to a film and substantially free of cross-links. These materials are soluble in dimethyl formamide and also may be formed into a film of desired thickness by spreading as a cement and evaporating the solvent. The polyesterurethane material is prepared by heating a mixture comprising (1) one mol of an essentially linear hydroxyl terminated polyester of a saturated aliphatic gylcol having from 4 to 10 carbon atoms and having hydroxyl groups on its terminal carbon atoms, and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from from about 0.1 to 2.1 mols of a saturated aliphatic free glycol containing from 4 to 10 carbon atoms and having hydroxyl groups on its terminal carbon atoms, the molar amount of said polyester and said free glycol combined being esentially equivalent to the molar amount of said diphenyl diisocyanate whereby there are essentially no unreacted isocyanate or hydroxyl groups in the reaction product. A polyesterurethane material of this type is available from the B. F. Goodrich Chemical Company as Estane 5740X1. It is in the form of granules and can be converted into film by milling and calendering or extruding or by deposition from a solvent cement. It is extremely tough and resistant to scuffing, abrasion and cracking. It requires little polishing to maintain a clean, shiny appearance such as is desired on shoes and other leather articles.

This polyesterurethane film is practically impermeable to water vapor in the thickness range of 4–15 mils which is the thickness employed as the surface layer of a leather-like combination, a feature which would lead to discomfort in the wearing of shoes made therefrom. We have introduced permeability into the heavy film by incorporating 100–300 parts of a carefully selected decomposition agent into the polymer mix. After the film either is extruded or is formed by spreading a solvent cement, it is passed through an oven or wet steam autoclave at 100° C. to decompose the decomposition agent particles which transform to the gaseous state. The decomposition agent has been selected so that its gaseous decomposition products are products to which the polyesterurethane film is permeable without distortions of the film. Water vapor, transpired from the wearer's body through the permeable non-woven base stratum of a leather-like construction is then readily passed off from the now porous polyurethane surface layer of the leather-like composition. It is readily seen that the decomposition agents we employ must decompose under the influence of heat to the gaseous form and in said gaseous form they must permeate the polyesterurethane film. Furthermore the agents must decompose or transform to the gaseous state at a temperature sufficiently below the softening range of the polyesterurethane film that no damage will occur to the film in the decomposition step.

The polyesterurethane films employed in this invention are permeable, in thicknesses from 4–15 mils, to gaseous ammonia, hydrogen and carbon dioxide. They are impermeable to air, oxygen, and nitrogen at these thicknesses. A polyesterurethane film 4 mils thick is slightly permeable to water vapor, but not enough to transpire sufficient water vapor to make a shoe constructed of this material comfortable to the foot.

The polyesterurethane films employed in the practice of this invention will soften and flow and suffer damage or close up openings which afford vapor permeability if they are exposed to temperatures of 130° C. and above.

Decomposition agents which are compatible with the polyesterurethane films, employed, which will transform to the gaseous state at temperatures below 130° C. and which in the gaseous state will permeate the polyesterurethane film without damage thereto include ammonium carbonate and ammonium bicarbonate with ammonium bicarbonate being preferred. From 100 to 300 parts of decomposition agent per 100 parts of polyesterurethane polymer are required to achieve satisfactory levels of water vapor permeability. The ammonium salt must be at least fine enough to pass through a 270 mesh screen. Coarser particles than this leave imperfections visible to the naked eye in the microporous polyurethane polymer layer.

An important feature of our invention is that the transformation to gases of the ammonium bicarbonate or ammonium carbonate and the permeation of these gases through the polyurethane material is essentially non-violent. By this we mean that the polyurethane layer is not damaged, ruptured, blown, foamed, increased in dimension or otherwise marred. Permeability to water vapor is achieved in the polyurethane film by means of microporosity that is created. No holes are visible to the eye even under 30× magnification. The physical appearance of the polyurethane is completely unchanged from its original status after the decomposition agent is thermally decomposed and removed.

Water vapor permeability was evaluated by employing standard one-half pint Ball canning jars equipped with Kerr type tops. The sample to be tested was die cut to the round shape and size of the metal insert in the jar top and was assembled in place of the metal insert when the jar was sealed. For test purposes the jar was filled about ½ full with water and the total weight of water, jar, top and sample was adjusted to 309.5 grams by adjusting the amount of water in the jar. This weight of water filled the jar approximately ½ full. The lid was assembled with the sample as the seal for the water in the jar and the jar was allowed to stand in the room at the prevailing conditions (approximately 70° F. and 20–30% relative humidity). The jar was weighed every day and the loss of weight recorded as grams of water loss per day. All samples had the same area. The average of 4 days' water losses was taken as a measure of sample permeability to water vapor.

EXAMPLE I

A mixture of 2323 grams (2.3 mols) of hydroxyl poly(tetramethylene adipate), molecular weight 1010, hydroxyl number 106.1, acid number 2.5, and 207 grams (2.3 mols) of butanediol-1,4 is melted in a four liter kettle and stirred with a spiral ribbon stirrer for 20 minutes at a pressure of 10 mm. at 100 to 105° C. To this mixture is then added 1149 grams (4.6 mols) of diphenyl methane - 1,p' - diisocyanate. The mixture is stirred 2 minutes, then poured into a container and baked in a 140° C. oven for 3.5 hours as the reaction goes to completion. The cooled material is a clear, snappy elastomer. It mills at 225°F., can be melt extruded, and can be dissolved in tetrahydrofuran, dimethyl formamide and the like to form gel free solution cements.

EXAMPLE II

Three 25% by weight solutions of the polymer prepared in Example I were made up in tetrahydrofuran. Solution A was maintained as a control. To solution B was added 100 parts ammonium carbonate per 100 parts polymer. To solution C was added 100 parts of ammonium bicarbonate per 100 parts of polymer.

These polymer solutions were passed through a 12 mil gap on to cellophane to form approximately 2 mil thick films. Pieces were die cut from each film to match the dimensions of the metal insert in the Kerr top of a Ball glass jar. The samples were placed in a wet steam bath at 100° C. for ½ hour, peeled from the cellophane and viewed under a microscope at 30× magnification. No holes were visible in the surfaces of any of the samples. No particles of carbonate or bicarbonate salts were visible either.

Permeability to water vapor was measured by the test described above. Four day averages of water vapor permeability measured in grams of water transmitted per 24 hours were:

A _____ 0.45
B _____ 1.92
C _____ 1.8
Calf skin leather _____ 2.0

EXAMPLE III

The polymeric solution C, of Example II, containing 100 parts ammonium bicarbonate per 100 parts of polymer was spread to form a film 6 mils thick on a non-woven fabric 18 mils thick made by the conventional wet paper process. The lower side of the cellulose layer was adhered to a non-woven layer of polypropylene, 3 denier, random web, cross laid and needled, 72 mils thick. The over-all sample thickness was 78 mils. The samples were given various heat treatments to remove the ammonium bicarbonate and evaluated in the described permeability test.

| Conditions | Minutes of Heat | 4 day average, g. water/day transmitted |
| --- | --- | --- |
| 60° C. water | 2520 | .37 |
| 225° F. wet steam | 30 | .30 |
| 250° F. wet steam | 30 | .23 |
| 100° C. dry oven | 381 | .32 |
| 110° C. dry oven | 158 | .30 |
| 120° C. dry oven | 78 | .33 |
| 130° C. dry oven | 63 | .33 |
| 140° C. dry oven | 47 | .18 |

These data show that warm water, wet steam and dry air up to 130° C. are all effective to transform the ammonium bircarbonate particles to gas, thereby leaving the polyesterurethane layer permeable to water vapor. It is logical that higher temperatures make the transformation take place more rapidly. Application of heat was stopped when ammonia gas was no longer detected in the gases coming off from the oven. The temperature of 140° C. is too high, however, the data indicates that at 140° C. the polyurethane layer has partially fused, closing the openings left by the gaseous products of the bicarbonate and the overall permeability is cut way down.

Films made porous by the process of this invention are readily combined with various non-woven fabric base stratums to form constructions which are useful as replacements for leather. Polyurethane films are strong, highly abrasion and scuff resistant, and have tear and tensile strengths comparable to leather. Even though impermeable to water vapor, such constructions can be fabricated into luggage, brief cases, purses and the like. When the polyurethane film has been rendered permeable to water vapor by the process of this invention, the leather-like constructions can be formed into shoe uppers and other articles of clothing in replacement of leather.

We claim:

1. The process of producing a microporous polymeric leatherlike material suitable for use in fabricating shoe uppers comprising: (a) forming a solution containing about 25% by weight of a thermoplastic essentially linear polyesterurethane dissolved in tetrahydrofuran, said polyurethane being the reaction product of (1) one mol of an essentially linear hydroxyl terminated polyester of a saturated aliphatic glycol having from 4 to 10 carbon atoms and having hydroxyl groups on its terminal carbon atoms, and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus and (3) from about 0.1 to 2.1 mols of a saturated aliphatic glycol containing from 4 to 10 carbon atoms and having hydroxyl groups on its terminal carbon atoms, the molar amount of said polyester and said free glycol combined being essentially equivalent to the molar amount of said diphenyl diisocyanate; (b) admixing with said solution from 100 to 300 parts by weight, per 100 parts by weight of the polyesterurethane present therein, of a solid material decomposable solely to ammonia, hydrogen and carbon dioxide gases, said solid material being selected from the class consisting of ammonium carbonate and ammonium bicarbonate and being in particulate form at least fine enough for all particles to pass through a 270 mesh screen; (c) spreading the admixture of said polyesterurethane and said decomposable material contained in said solution into film of 4 to 15 mils thickness on to a non-woven fabric backer, said film being continuous and non-porous as viewed under a miccoscope at 30× magnification, and (d) exposing said non-woven fabric backer with said film thereon to conditions which decompose said decomposable material into ammonia, hydrogen and carbon dioxide gases but at a temperature below 130° C. until evolution of ammonia gas from said film ceases, thereby to produce microporosity in said film as a result of gas evolution without changing the surface of said film as when viewed at 30× magnification.

2. The process of claim 1 wherein the microporous polyesterurethane film produced has a closed cell structure.

References Cited by the Examiner

UNITED STATES PATENTS

| | | | |
|---|---|---|---|
| 2,780,606 | 2/57 | Hoppe et al. | 260—2.5 |
| 2,871,218 | 1/59 | Schollenberger | 260—32.6 |
| 3,000,757 | 9/61 | Johnston et al. | 260—77.5 |
| 3,041,193 | 6/62 | Hamway et al. | 117—11 |
| 3,075,930 | 1/63 | Stewart et al. | 260—2.5 |
| 3,125,617 | 3/64 | Hoppe | 260—2.5 |

FOREIGN PATENTS

| | | |
|---|---|---|
| 954,916 | 12/56 | Germany. |
| 955,224 | 1/57 | Germany. |

WILLIAM D. MARTIN, *Primary Examiner.*

DONALD ELZAJO, *Examiner.*